United States Patent
Balasubramanian et al.

(10) Patent No.: US 10,127,821 B2
(45) Date of Patent: Nov. 13, 2018

(54) AIRCRAFT SYSTEMS AND METHODS TO IMPROVE AIRPORT TRAFFIC MANAGEMENT

(71) Applicant: HONEYWELL INTERNATIONAL INC., Morristown, NJ (US)

(72) Inventors: Padmashree Balasubramanian, Tamil Nadu (IN); Ravindra Jayaprakash, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/749,227

(22) Filed: Jun. 24, 2015

(65) Prior Publication Data

US 2016/0379499 A1 Dec. 29, 2016

(51) Int. Cl.
| | | |
|---|---|---|
| *G06G 5/00* | (2006.01) | |
| *G08G 5/00* | (2006.01) | |
| *G08G 5/06* | (2006.01) | |
| *G06T 7/73* | (2017.01) | |

(52) U.S. Cl.
CPC ............. *G08G 5/0013* (2013.01); *G06T 7/73* (2017.01); *G08G 5/0021* (2013.01); *G08G 5/06* (2013.01); *G08G 5/065* (2013.01); *G06T 2207/10032* (2013.01); *G06T 2207/30204* (2013.01)

(58) Field of Classification Search
None
See application file for complete search history.

(56) References Cited

U.S. PATENT DOCUMENTS

| | | | |
|---|---|---|---|
| 5,218,360 A * | 6/1993 | Goetz | ............. G01S 1/14 342/196 |
| 5,689,273 A | 11/1997 | Bailey et al. | |
| 8,019,529 B1 | 9/2011 | Sharma et al. | |
| 8,040,258 B2 | 10/2011 | Ibrahim et al. | |
| 8,175,799 B1 | 5/2012 | Woehler | |
| 8,670,921 B2 | 3/2014 | Lussiez et al. | |
| 9,487,304 B1 * | 11/2016 | Bowen | ........... G08G 5/065 |
| 2003/0009278 A1 | 1/2003 | Mallet et al. | |
| 2007/0129854 A1* | 6/2007 | Sandell | ........... G08G 5/0013 701/3 |

(Continued)

FOREIGN PATENT DOCUMENTS

| | | |
|---|---|---|
| EP | 2610590 A2 | 7/2013 |
| EP | 2506237 B1 | 12/2013 |

(Continued)

OTHER PUBLICATIONS

Machine translation of JP 2002245600 A; Aug. 2002; translated by espacenet.com.*

(Continued)

*Primary Examiner* — David P. Merlino
(74) *Attorney, Agent, or Firm* — Lorenz & Kopf, LLP (57) ABSTRACT

An aircraft system includes a processing unit configured to identify an airport marker during a surface operation at an airport. The processing unit is further configured to automatically generate a reporting message based on the airport marker at a predetermined location relative to the airport marker. The aircraft system further includes a communications unit coupled to the processing unit and configured to send the reporting message.

9 Claims, 4 Drawing Sheets

(56) References Cited

U.S. PATENT DOCUMENTS

| | | | |
|---|---|---|---|
| 2009/0115637 A1* | 5/2009 | Naimer | G08G 5/0021 340/979 |
| 2009/0150013 A1* | 6/2009 | Finn | G08G 5/0026 701/11 |
| 2010/0161218 A1* | 6/2010 | Hedrick | G08G 5/0013 701/120 |
| 2013/0169450 A1 | 7/2013 | He | |
| 2014/0297168 A1* | 10/2014 | Ovens | G08G 5/065 701/120 |
| 2014/0309915 A1 | 10/2014 | Beda et al. | |
| 2016/0035227 A1* | 2/2016 | Kumar | G08G 5/0013 340/971 |

FOREIGN PATENT DOCUMENTS

| | | | |
|---|---|---|---|
| EP | 2728565 A2 | 5/2014 | |
| JP | 2002245600 A | * 8/2002 | |
| WO | 2014115139 A1 | 7/2014 | |

OTHER PUBLICATIONS

PR Newswire;, "Northrop Grumman and Honeywell Demonstrate Integrated Airborne and Surface Tracking Systems" Sep. 29, last reviewed Mar. 12, 2015.

University of Malta; "Alicia," Avionics Research Projects, Electronic Systems Engineering, University of Malta, 2008-2016.

Federal Aviation Administraition,; "Advisory Circular," U.S. Department of Transportation, Apr. 29, 2005, and subsequent changes on Mar. 31, 2008, and Jun. 6, 2008.

Extended EP Search Report for Application No. 16174282.0-1803 dated Oct. 27, 2016.

EP Examination Report for Application No. 16174282.0 dated Feb. 2, 2018.

* cited by examiner

AIRCRAFT SYSTEMS AND METHODS TO IMPROVE AIRPORT TRAFFIC MANAGEMENT

TECHNICAL FIELD

The present invention generally relates to aircraft systems and methods to improve airport traffic management.

BACKGROUND

In an airport environment, air traffic control and individual aircraft use various systems and protocols in an attempt to efficiently negotiate the airport runways and taxiways without incident. For example, aircraft systems may include synthetic vision systems (SVS) with airport moving map displays that render data from an airport mapping database on a display to improve situational awareness of the aircraft operator and/or air traffic control. Air traffic control systems may include airport surface detection equipment (ASDE-X), airport movement area safety systems (AMASS), and/or airport surface surveillance capability systems (ASSC) that may detect and display ground traffic. In some systems, air traffic control and aircraft may use lights, markings, and signage installed in various locations within the airport to assist in the orderly management of airport traffic. However, some conventional systems may be more challenging to implement during low visibility conditions in which the aircraft operator and/or air traffic control may have difficulty identifying the relevant features and generating the appropriate response. Although conventional display systems provide various types of information about the flight environment, such displays and associated systems may not be as helpful during airport environments.

Accordingly, it is desirable to provide systems and methods that improve situational awareness and assist the aircraft operator and/or air traffic control in airport environments to improve the management of airport traffic. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an aircraft system includes a processing unit configured to identify an airport marker during a surface operation at an airport. The processing unit is further configured to automatically generate a reporting message based on the airport marker at a predetermined location relative to the airport marker. The aircraft system further includes a communications unit coupled to the processing unit and configured to send the reporting message.

In accordance with another exemplary embodiment, a method is provided for reporting position information by an aircraft. The method includes identifying an airport marker during a surface operation by the aircraft; formatting a message associated with the airport marker; and sending, upon reaching a predetermined position relative to the airport marker, the message based on the airport marker to report position information about the aircraft.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments described herein provide aircraft systems and methods for managing airport traffic. More specifically, the systems and methods detect and identify airport markers, for example, with sensors or database data. Upon reaching a predetermined position at or before the designated marker, the aircraft system generates and sends a message associated with the airport marker to air traffic control and/or other aircraft operators. This information may assist the aircraft operator (e.g., the aircraft pilot or aircraft flight crew) and/or air traffic control in locating the aircraft and taking appropriate action.

Figure 1:
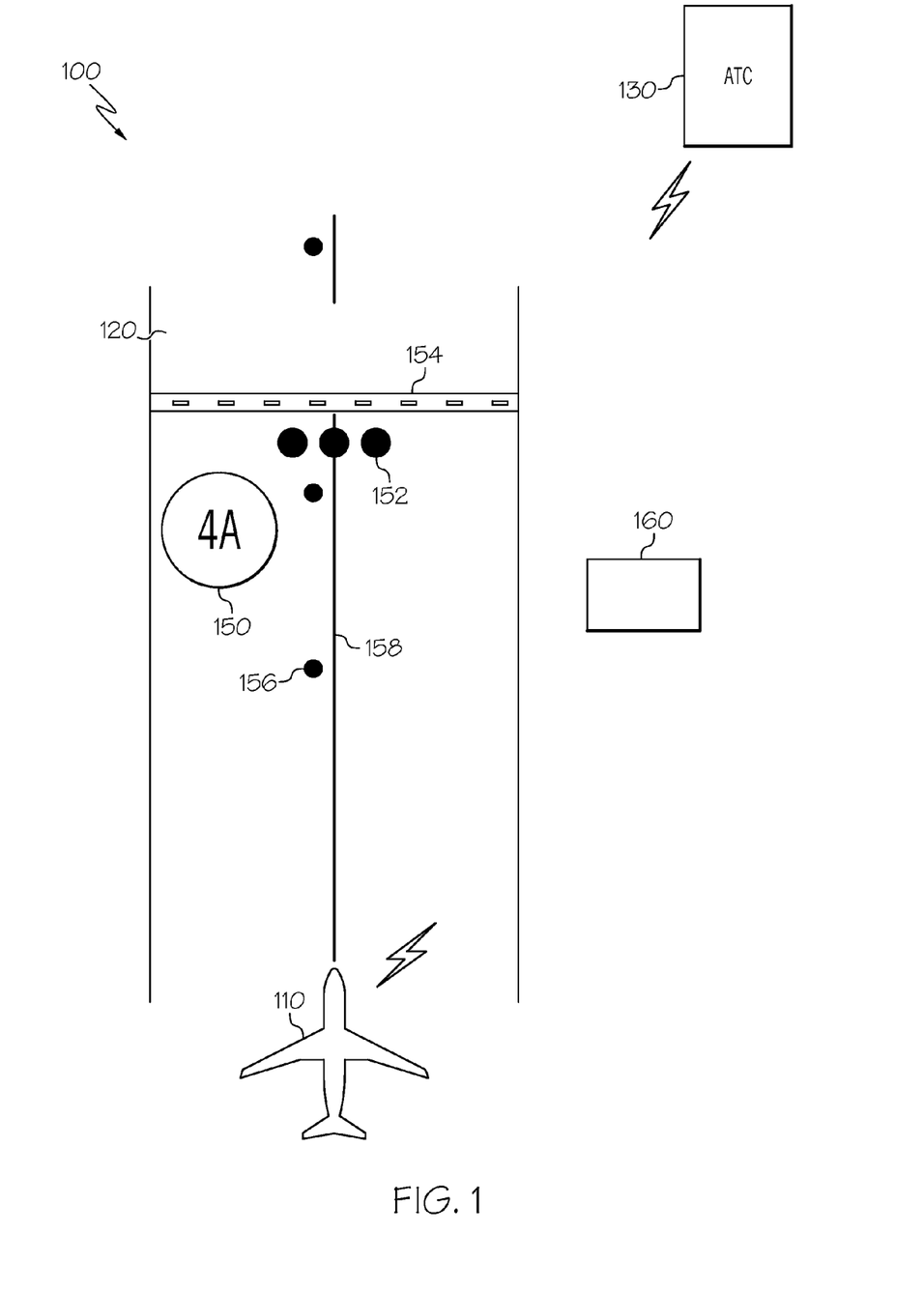
FIG. 1 is an airport surface environment suitable for use with an aircraft system and method in accordance with an exemplary embodiment.

FIG. 1 is a simplified diagram of an airport environment (or airport surface environment) 100, such as that in which the aircraft systems and methods discussed below may operate. As shown, the airport environment 100 may include one or more aircraft 110 and taxiway 120. The aircraft 110 may operate in various modes in the airport environment 100, including takeoff, taxiing, rollout, or idle. In the particular scenario of FIG. 1, aircraft 110 is navigating the taxiway 120. Generally, when the aircraft 110 is moving or stationary on the ground in the airport environment 100, the aircraft 110 is considered to be conducting a "surface operation." As shown, and as discussed in greater detail below, the aircraft 110 may communicate with air traffic control 130 and/or other aircraft operators.

As is typical for many airport environments, FIG. 1 also depicts various types of signage, markings, and lighting to assist the operator (e.g., the pilot) in navigating the airport. Generally, this type of information that is installed, painted, or otherwise provided at the airport may be referred to as "airport markers." As examples, the airport environment 100 of FIG. 1 includes a geographic position marking 150, clearance bar 152, and intermediate holding position markings 154. Other types of airport markers in FIG. 1 include taxiway centerline lighting 156, taxiway centerline marking 158, and signage 160. Other types of airport markers may be provided.

Briefly, geographic position markings 150 indicate a specific location on the airport surface and may function as air traffic control position reporting points and/or hold points. In practice, each geographic position marking 150 may be a pink circle outlined with black and white circles and designated with a letter, number, or both. The holding position markings 154 are surface markings that indicate a holding position to the aircraft and may be collated with a clearance bar 152 and/or the geographic position markings 150. The holding position markings 154 depicted in FIG. 1 may be considered intermediate position holding markings. Other type of holding or stop markings such as runway holding position markings, ILS/MLS holding position markings, and the like may also be provided as appropriate. The clearance bar 152 may be collocated with geographic position markings 150 and/or intermediate holding position markings 154. In particular, as an example from an FAA regulation, for a taxi route designated for use in visibilities below 600 RVR, geographic position markings may be collocated with intermediate holding position markings as well as a clearance bar formed by three yellow lights. The exemplary embodiments discussed herein are also applicable to other scenarios.

Although not shown, other types of airport markers may include runway threshold markings, runway designation markings, runway aiming point markings, runway touchdown zone markings, runway centerline markings, runway side stripe markings, runway lighting, and various types of signage. Airport markers may be subject to standards and requirements as set forth by the International Civil Aviation Organization and/or the Federal Aviation Administration. The airport markers depicted in FIG. 1 and discussed below are mere examples, and exemplary embodiments discussed below are applicable to any suitable type of airport markers.

In many airport environments, individual aircraft and air traffic control use the airport markers to insure the orderly management of traffic flow. For example, certain markers may require particular action on the part of the aircraft, such as pausing, stopping, reporting, and/or awaiting affirmative clearance or other instructions from air traffic control. During low visibility conditions such as snow or fog, the airport markers may be difficult for the aircraft operator to visually identify. The exemplary embodiments discussed below address these challenges.

In one exemplary embodiment, the airport markers may function as part of an airport Surface Management Guidance and Control System (SMGCS) during low visibility conditions in which the geographic position markings 150 are position reporting points along the low visibility routes to assist air traffic control in tracking the positions of the aircraft to maintain ground traffic separation, avoid any potential runway incursions, and enhance the traffic flow for surface operations, as examples. As noted above, the geographic position markings 150 may be collocated with intermediate holding position markings 154 as well as clearance bar 152 (e.g., three yellow lights, in one example) at some intersections.

Figure 2:
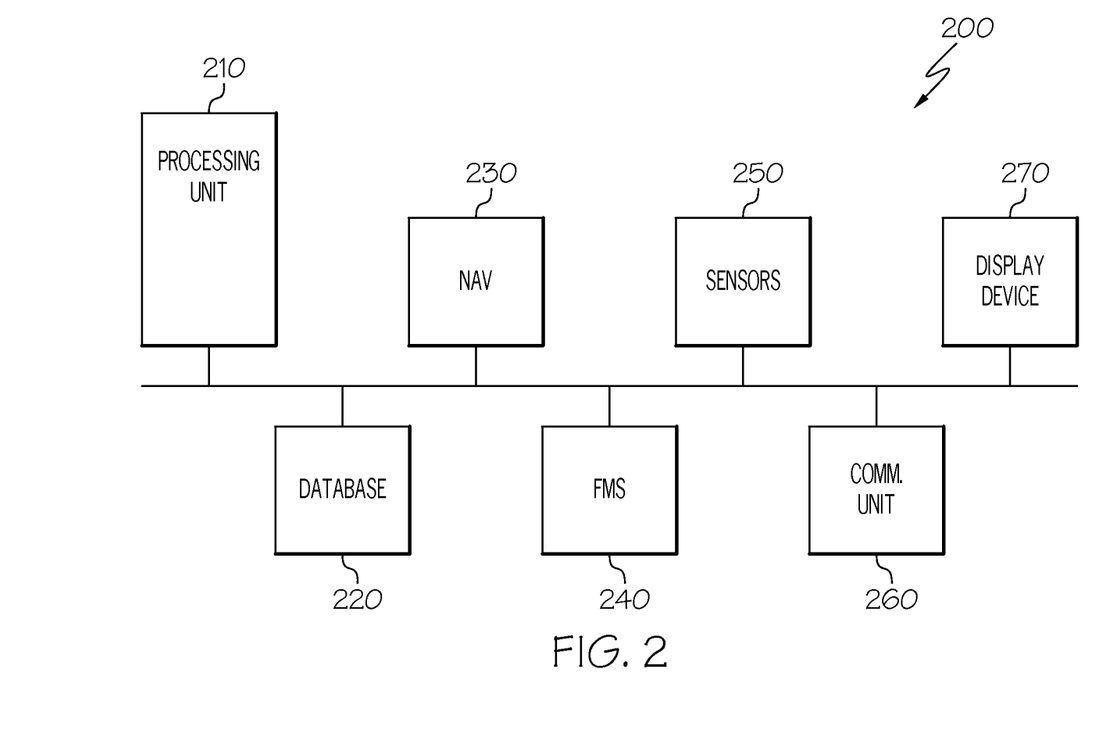
FIG. 2 is a functional block diagram of an aircraft system in accordance with an exemplary embodiment.

FIG. 2 is a block diagram of an aircraft system 200 in accordance with an exemplary embodiment. It should be understood that FIG. 2 is a simplified representation of the system 200 for purposes of explanation and ease of description. Further exemplary embodiments of the system 200 may include additional or other devices and components for providing further functions and features. The system 200 can be utilized in an aircraft, such as a helicopter, airplane, or unmanned vehicle. Moreover, exemplary embodiments of the system 200 can also be utilized in spacecraft, ships, submarines, and other types of vehicles, including land vehicles. For simplicity, exemplary implementations are described below with reference to "aircraft."

In the airport environment 100 depicted in FIG. 1, the system 200 may be installed in the aircraft 110 for use during surface operations on the ground at an airport, particularly during low visibility conditions to assist in traffic management. As noted above, the system 200 may be used to identify, evaluate, and report position at designated airport locations (e.g., at or approaching geographic position markings), but the exemplary embodiments discussed herein are applicable to any type of airport markers and in any relevant scenario. Additional details about the operation of the system 200 are provided below after a brief introduction of the components of the system 200.

As shown in FIG. 2, the system 200 includes a processing unit 210, a database 220, a navigation system 230, a flight management system 240, sensors 250, a communications unit 260, and a display device 270 coupled together in any suitable manner, such with as a data bus. Although the system 200 appears in FIG. 2 to be arranged as an integrated system, the system 200 is not so limited and can also include an arrangement whereby one or more aspects of the system 200 are separate components or subcomponents of another system located either onboard or external to the aircraft The processing unit 210 may be a computer processor associated with any applicable aircraft system (e.g., including the flight management system 240 or a separate system). In one exemplary embodiment, the processing unit 210 functions to at least receive and/or retrieve aircraft management information (e.g., from the flight management system 240), navigation and control information (e.g., from the navigation system 230), and airport, landing, target and/or terrain information (e.g., from the database 220, sensors 250, and/or communications unit 260). As described below, the processing unit 210 additionally processes this information to identify the airport markers and to initiate appropriate action, including communications with air traffic control or other aircraft operators. Particularly, the processing unit 210 may format an appropriate message to air traffic control or other aircraft operators based on the airport marker, e.g., to provide a conditional transmission of a position report upon approaching or reaching a designated airport marker.

In some embodiments, among other functions and discussed in further detail below, the processing unit 210 may additionally calculate and generate display commands associated with the flight or airport environment. As such, the processing unit 210 may function as a graphics display generator to generate display commands based on algorithms or other machine instructions stored in the processing unit 210 or in separate memory components. The processing unit 210 then sends the generated display commands to display device 270 for presentation to the user. In some embodiments, the processing unit 210 of the system 200 may include or be integrated with a synthetic vision system (SVS), an enhanced vision system (EVS) (or enhanced flight vision system (EFVS)), or a combined vision system (CVS). Generally, the SVS is configured to receive flight management and position information (e.g., from the navigation system 230 and flight management system 240) and terrain or airport topography information (typically from database 220) to generate a three-dimensional image that shows the topographical environment through which the aircraft is flying or traveling from the perspective of a person sitting in the cockpit of the aircraft. Generally, the EVS receives flight management and position information (e.g., from the navigation system 230 and flight management system 240) and airport information (typically from sensors 250) to form an image that may be displayed to the pilot. CVS is a combination of an EVS and SVS in which aspects of enhanced and synthetic elements are displayed on a common display. Although the processing system 210 may operate to display aspects of the airport environment to the aircraft operator and/or air traffic control, such display is not necessary for generation and receipt of messages between the aircraft and air traffic control.

Depending on the embodiment, the processing unit 210 may be implemented or realized with a general purpose processor, a content addressable memory, a digital signal processor, an application specific integrated circuit, a field programmable gate array, suitable programmable logic device, discrete gate or transistor logic, processing core, discrete hardware components, or any combination thereof. In practice, the processing unit 210 includes processing logic that may be configured to carry out the functions, techniques, and processing tasks or methods associated with operation of the system 200. The computer readable instructions, firmware and software programs are tangibly embodied on any appropriate medium used for storage of computer readable instructions including, but not limited to, all forms of non-volatile memory, including, by way of example and not by limitation, semiconductor memory devices, such as EPROM, EEPROM, and flash memory devices; magnetic disks such as internal hard disks and removable disks; magneto-optical disks; and DVD disks.

Although not shown, the processing unit 210 may include a user interface coupled to the processing unit 210 to allow a user to interact with the display device 270 and/or other elements of the system 200. The user interface may be realized as a keypad, touchpad, keyboard, mouse, touch panel, joystick, knob, line select key or another suitable device adapted to receive input from a user. In some embodiments, the user interface may be incorporated into the display device 270, such as a touchscreen. In further embodiments, the user interface is realized as audio input and output devices, such as a speaker, microphone, audio transducer, audio sensor, or the like.

Database 220 is coupled to processing unit 210 and can be a memory device (e.g., non-volatile memory, disk, drive, tape, optical storage device, mass storage device, etc.) that stores digital airport, landing, waypoint, target location, and terrain data as either absolute coordinate data or as a function of aircraft position that enables the construction of a synthetic or enhanced representation of the aircraft operating environment. For example, database 220 may include information associated with airport surface markings, lighting, and signage for surface navigation. Database 220 can additionally include other types of navigation and/or operational information relating to the evaluation and display of airport markers. Moreover, the database 220 may include data associated with the consequence of the airport markers in view of the nature of the marker, visibility conditions, and other considerations.

The airport data in database 220 may be obtained from airports, Runway Awareness and Advisory System (RAAS), airport mapping database (AMDB), and/or the Federal Aviation Administration (FAA). The airport data may also include a map and topographic information associated with the airport, which includes data defining the runways and taxiways at the airport, including the airport markers described above. This data may be used to identify airport markers, determine aircraft position, and to otherwise assist the operator or air traffic control with monitoring and evaluating airport traffic, as discussed below. Data in the database 220 may be uploaded prior to flight or received from external sources, such as an airport transmitter or onboard sensors.

The navigation system 230 is configured to provide the processing unit 210 with real-time navigational data and/or information regarding operation of the aircraft. The navigation system 230 may include or cooperate with a global positioning system (GPS), inertial reference system (IRS), Air-data Heading Reference System (AHRS), or a radio-based navigation system (e.g., VHF omni-directional radio range (VOR) or long range aid to navigation (LORAN)). The navigation system 230 is capable of obtaining and/or determining the current state of the aircraft, including the location (e.g., latitude and longitude), altitude or above ground level, airspeed, pitch, glide scope, heading, and other relevant flight or operational information.

The flight management system 240 supports navigation, flight planning, and other aircraft control functions, as well as provides real-time data and/or information regarding the operational status of the aircraft. The flight management system 240 may include or otherwise access one or more of the following: a weather system, an air traffic management system, a radar system, a traffic avoidance system, an autopilot system, an auto-thrust system, a flight control system, hydraulics systems, pneumatics systems, environmental systems, electrical systems, engine systems, trim systems, lighting systems, crew alerting systems, electronic checklist systems, an electronic flight bag, and/or other suitable avionics systems. As examples, the flight management system 240 may identify operating states of the aircraft, such as engine operation and current aircraft configuration status, including information regarding the current flap configuration, aircraft speed, aircraft pitch, aircraft yaw, aircraft roll, and the like. Additionally, the flight management system 240 may identify or otherwise determine environmental conditions at or near the current location of the aircraft, such as, for example, the current temperature, wind speed, wind direction, atmospheric pressure, and turbulence. The flight management system 240 may also identify optimized speeds, distance remaining, time remaining, cross track deviation, navigational performance parameters, and other travel parameters.

The system 200 may include or otherwise receive information from one or more sensors 250. In one exemplary embodiment, the sensors 250 may include sensors configured to detect a light signature originating from outside the aircraft, such as a visible low light television camera, an infrared camera, and millimeter wave (MMW) camera or any other light sensing device capable of detecting light either within or outside of the visible spectrum. Other sensors 250 may include, as examples, radar, lidar, sonar, and/or weather sensors that may provide information to the system 200. In some embodiments, the sensors 250 may be incorporated into an enhanced vision system, the navigation system 230, and/or flight management system 240. As described below, the sensors 250 may particularly function to collect information about the airport markers.

The communications unit 260 may be any suitable device for sending and receiving information to and from the system 200. In some embodiments, communications unit 260 may be configured to receive radio frequency transmissions, satellite communication transmissions, optical transmissions, laser light transmissions, sonic transmissions or transmissions of any other wireless form of data link. In one exemplary embodiment, the communications unit 260 may include, for example, an automatic dependent surveillance-broadcast (ADSB) transceiver. In one exemplary embodiment, the communications unit 260 is configured to send and/or receive information from the airport and/or air traffic control. The processing unit 210 and/or communications unit 260 may include a communication management unit (CMU) to facilitate the sending and receipt of messages between the aircraft and air traffic control.

As described in greater detail below, the communications unit 260 may form part of various types of communication systems, and the processing unit 210 is configured to appropriately prepare and format messages associated with the various types of systems. As one example, the communications unit 260, processing unit 210, and display unit 270 may operate as part of a controller pilot data link communication (CPDLC) system that enables air traffic control to exchange messages with one or more aircraft over a data link. In addition to air traffic control, the communications unit 260, processing unit 210, and display unit 270 may further operate to exchange messages with other aircraft operators in any suitable protocol or system according to the exemplary embodiments discussed herein.

Generally, CPDLC is a format or protocol of visual or text-based communications between an aircraft and air traffic control. For example, a CPDLC application implemented by the processing unit 210 may include a set of predefined message elements, which may correspond to voice phraseology typically employed by air traffic control procedures. The CPDLC system is capable of issuing many different types of messages, including level assignments, crossing constraints, lateral deviations, route changes and clearances, speed assignments, radio frequency assignments, and various requests for information that may be broadcast to every aircraft within a given range, a subset of the aircraft, or to a specific aircraft. Similarly, the CPDLC system enables the aircraft to respond to messages, to request clearances and information, to report information, and to declare/rescind an emergency. In addition to the predefined message elements, CPDLC messages may further include a "free text" portion that enables the exchange of information not conforming to defined formats. The CPDLC messages may be generated and formatted by the processing unit 210 and sent by the communications unit 260. The sent and/or received messages may be displayed to the aircraft operator on the display device 270. As particularly described below, the system 200 may send and receive CPDLC messages to air traffic control regarding airport markers. Such CPDLC messages may be automatically generated and sent at predetermined positions relative to the airport markers.

The CPDLC messages may be transmitted over a Future Air Navigation Services (FANS) or Aeronautical Telecommunications Network (ATN). FANS uses an Aircraft Communications Addressing and Reporting System (ACARS) network for transmission of CPDLC messages, while ATN is a high speed digital network that may offer faster speed over traditional ACARS networks. Generally, the FANS ACARS and ATN networks use a direct datalink system for transmission of short messages between aircraft and air traffic control.

The system 200 also includes the display device 270 coupled to the processing unit 210. The display device 270 may include any device or apparatus suitable for displaying various types of computer generated symbols and flight information discussed above. Using data retrieved (or received) from the database 220, navigation system 230, flight management system 240, sensors 250, and/or communications unit 260, the processing unit 210 executes one or more algorithms (e.g., implemented in software) for determining the position of the various types of desired information on the display device 270. As noted above, the processing unit 210 then generates display commands representing this data, and sends display commands to the display device 270.

In various exemplary embodiments, the rendered image may be a two-dimensional lateral view, a two-dimensional vertical profile view, or a three-dimensional perspective view. Any suitable type of display medium capable of visually presenting multi-colored or monochrome flight information for a pilot or other flight crew member can be provided, such as, for example, various types of CRT displays, LCDs, OLED displays, plasma displays, projection displays, HDDs, HUDs, and the like.

Accordingly, the system 200 functions to generate automated position reporting messages at predetermined positions relative to airport markers, particularly during low visibility operations, and provides these messages to air traffic control in order to assist the aircraft operator and/or air traffic control with aircraft navigation and traffic management. A more detailed description of the operation of the system 200 is provided below with reference to FIG. 3.

Figure 3:
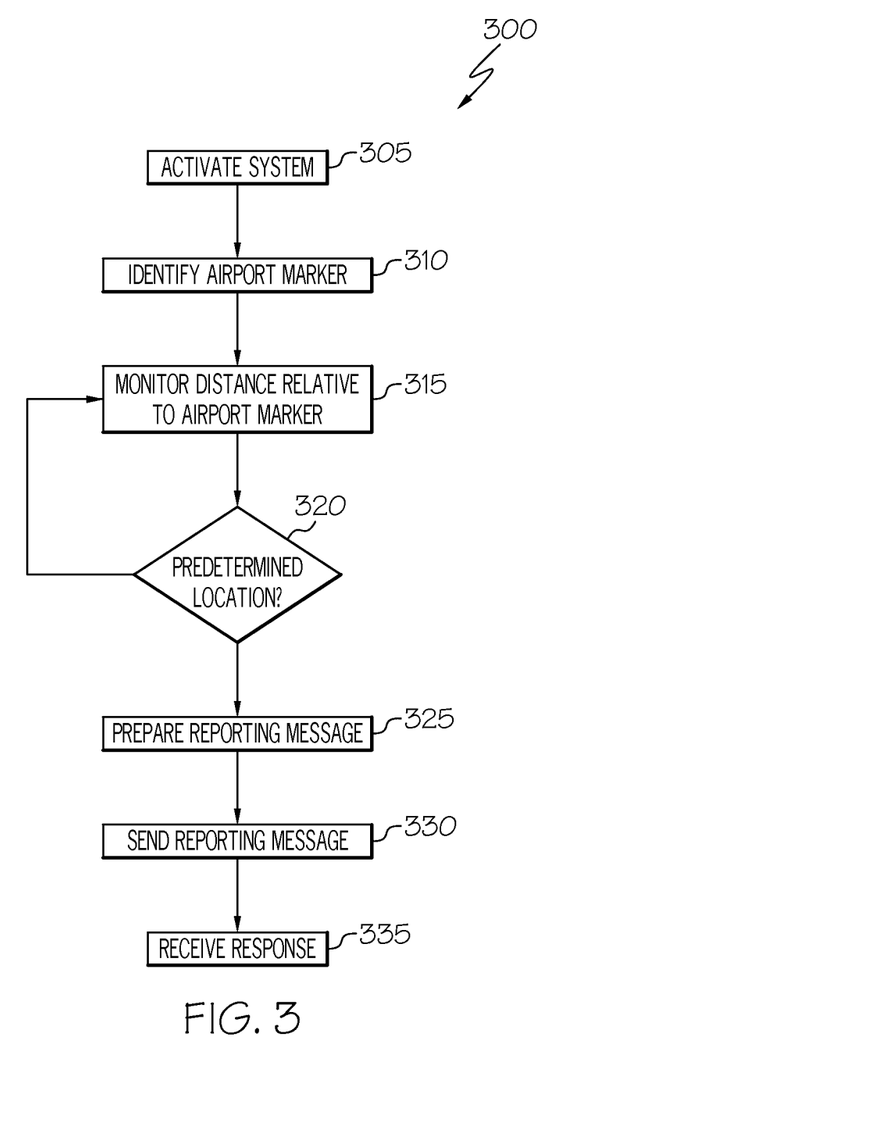
FIG. 3 is a flowchart of a method for managing airport traffic in accordance with an exemplary embodiment.

FIG. 3 is a flowchart of a method 300 for monitoring aircraft traffic. In one exemplary embodiment, the method 300 is implemented on an aircraft, although in other embodiments, the method 300 may be implemented from the perspective of an operator outside of the aircraft, such as air traffic control. As one example, the method 300 may be implemented by the system 200 of FIG. 2 in the environment 100 of FIG. 1. As such, FIGS. 1-3 are referenced in the discussion below. It should be appreciated that method 300 may include any number of additional or alternative tasks, and the tasks shown in FIG. 3 need not be performed in the illustrated order.

In a first step 305, the system 200 is activated. In one exemplary embodiment, the system 200 may operate any time the aircraft is engaging in a surface operation within the airport environment 100. In other embodiments, the system 200 is operated based on weather or visibility conditions. For example, as noted above, the flight management system 240 may include or have access to visibility data from a weather system, or such information may be received from air traffic control. In response, the operator may manually activate the system 200 or the system 200 may automatically begin operation.

In step 310, the system 200 functions to identify an airport marker, such as one of the airport markers depicted in FIG. 1. The system 200 may identify the airport marker in any suitable manner. In another exemplary embodiment, the system 200 may detect an airport marker with one of the sensors 250, such as an optical camera and/or an infrared sensor that may form part of enhanced vision capabilities. In one exemplary embodiment, the system 200 may identify the airport marker based on the current position of the aircraft (e.g., as provided by the flight management system 240) and the airport data in the database 220. In further exemplary embodiments, the system 200 may identify the airport marker by pattern and/or character recognition based on data from the sensors 250. For example, the system 200 may determine the number or arrangement of lighting that identifies a particular airport marker based on sensor data from sensors 250. In some embodiments, the sensor data may be compared to data in database 220, such as synthetic vision data. In other embodiments, the airport markers may be directly identified with optical sensor data, e.g., by parsing and recognizing the information (such as alphanumeric identifiers) contained in the airport marker. Upon identification of the airport marker, in some exemplary embodiments, the system 200 may display the airport marker to the aircraft operator. For example, the system 200 may generate display signals representing a synthetic or enhanced image of the airport marker on the display device 270. In one exemplary embodiment, the airport marker may be presented on a primary flight display.

In step 315, the system 200 may monitor the distance between the current position of the aircraft and the airport marker. In one exemplary embodiment, the system 200 may determine this distance based on the known current position of the aircraft (e.g., from the GPS of the flight management system 240) and the known fixed position of the airport marker (e.g. as determined from the stored airport data in database 220). In other exemplary embodiments, the system 200 may determine this distance with one or more of the sensors 250 (e.g., with radar or infrared sensor) that may calculate the distance between the sensor and the airport marker as the aircraft approaches the marker.

In effect, step 315 introduces a condition for the system 200 in which further actions are only taken upon reaching the predetermined position, as described below. In some exemplary embodiments, step 315 may be omitted, and the method 300 may proceed to subsequent steps immediately upon identifying the airport marker in step 310.

In step 320, upon reaching a predetermined location with respect to the airport marker, the system 200 identifies the current position of the aircraft. The predetermined location may be a predetermined distance from the airport marker (e.g., 100 feet from the airport marker) or at the airport marker (e.g., 0 feet from the airport marker). In some exemplary embodiments, the system 200 may determine the position based on the fixed location of the airport marker, e.g., based on airport data stored in the database 220 and sensor data. In other exemplary embodiments, the location may be determined by, for example, GPS data from the flight management system 240.

In one exemplary embodiment, the aircraft location may be identified with a geographic position marking. In some scenarios, the geographic position marking corresponds to the airport marker identified and monitored in steps 310 and 315. In other embodiments, the geographic position marking may be associated with or otherwise collocated with the airport marker identified and monitored in steps 310 and 315. For example, geographic position markings may be collocated with intermediate holding position markings and/or a clearance bar. Accordingly, if geographic position marking is identified as the airport marker identified and monitored in steps 310 and 315, the system 200 recognizes that intermediate holding position markings along with a clearance bar may also be present, such that additional reporting steps may be necessary or desired, as discussed below.

In step 325, the system 200 may prepare a reporting message for air traffic control or other aircraft operators, as appropriate. As noted above, such reporting messages may be necessary or desired when the airport marker is a geographic position marker. The protocol or procedure for reporting may be set by the airport, company policy, and/or government regulation. In one exemplary embodiment, the generation and sending of the reporting messages to air traffic control may be automated by the system 200. In other words, no action is required on the part of the aircraft operator. In other embodiments, the messages may be manually initiated by the operator of the aircraft and/or generated upon a request from air traffic control.

In one exemplary embodiment, the aircraft markers (and thus, the aircraft positions) in steps 310, 315, 320, and 325 may be designated by an aircraft operator, e.g., based on input at the user interface of the processing unit 210. For example, the aircraft operator may identify the type of aircraft markers that should be identified, monitored, and reported to air traffic control and/or other aircraft operators. In further embodiments, such designations may be set by company policy, regulation, and/or airport.

In one exemplary embodiment, the reporting message may include the identification and/or additional information about the airport marker. As noted above, the system 200 may extract information about the airport marker from the image of the airport marker, from the database 220, or from a combination thereof in which data from the sensors 150 and from the database 220 are compared to confirm the airport marker. For example, the processing unit 210 may extract alphanumeric information or other types of symbology from the airport marker, e.g. with optical character recognition algorithms.

The reporting message may take any suitable format. In one exemplary embodiment, the message may be a CPDLC message. As noted above, the CPDLC message is a text-based message that may provide advantages relative to traditional voice communications, particularly with respect to automated message generation.

The CPDLC message may have the following format: [Aircraft Call Sign] [Aircraft Position] [Timestamp] [CPDLC free text describing airport marker and/or position relative to the airport marker]. For example, if the aircraft is 100 meters behind the 4A GPM, the free text portion of the CPDLC message may be formatted as "100 Meters Behind 4A". The aircraft position may be provided with latitude and longitude coordinates and/or other formats, such as relative to airport coordinates. Any other suitable format may be provided. The free text portion of the CPDLC message may provide a convenient place to describe information associated with the airport marker to be included with the other preset message elements of the CPDLC message protocol.

As noted above, the message may include information extracted from the airport marker, such as alphanumeric information extracted from enhanced or synthetic vision data or other feature that identifies the airport marker, as identified by a sensor and/or retrieved from database data. This information may be encoded into the free text portion of a CPDLC message, along with other information discussed above. In Table 1, examples and/or descriptions of the free text portion of the messages associated with various types of airport markers are presented below as a mere subset of possible free text that may be sent to identify the airport marker.

TABLE 1

| AIRPORT MARKERS | MESSAGE |
| --- | --- |
| ILS Holding Point Location Markings | "ILS'" |
| Geographic Position Marker | Alphanumeric text containing the GPM, e.g. "4A" |
| Holding Position Sign for a Runway Approach Area | "15-APCH" |
| Runway Aiming Point | [RUNWAY_IDENTIFIER] "RWY AIMING POINT", e.g., "25R RWY AIMING POINT" |
| Predetermined distance behind surface marking | [PREDETERMINED_DISTANCE] "METERS BEHIND" [SURFACE_MARKING] |

In some exemplary embodiments, the system 200 may additionally include an image of the airport marker with the message. For example, the processing unit 210 may use an enhanced vision system and/or synthetic vision system to generate and/or enhance a suitable image that may improve the ability of air traffic control and/or the operator to consider the airport marker. Such images may be sent through wireless media in addition to or in lieu of the CPDLC messages discussed above in which the free text portion of the CPDLC message may be used to identify the marker and the alphanumeric portion of the marker.

In step 330, the system 200 sends the reporting message to aircraft traffic control. As noted above, the message, particularly a CPDLC message, may be transmitted to air traffic control with a FANS or ATN network, which may provide more reliable and efficient reporting of the aircraft position to air traffic control. As a result of this step, air traffic control receives notice that the aircraft is at a particular location, e.g., at a geographic position marker along a SMGCS low visibility taxi route, thereby insuring that air traffic control is aware of the sequencing of points along that taxi route for the aircraft. Accordingly, air traffic control may parse or otherwise interpret and evaluate the message, and as appropriate, take action. For example, the message may be incorporated into a traffic display for air traffic control to view and monitor all airport traffic. Such a perspective may also be provided to the aircraft as part of a traffic display.

Figure 4:
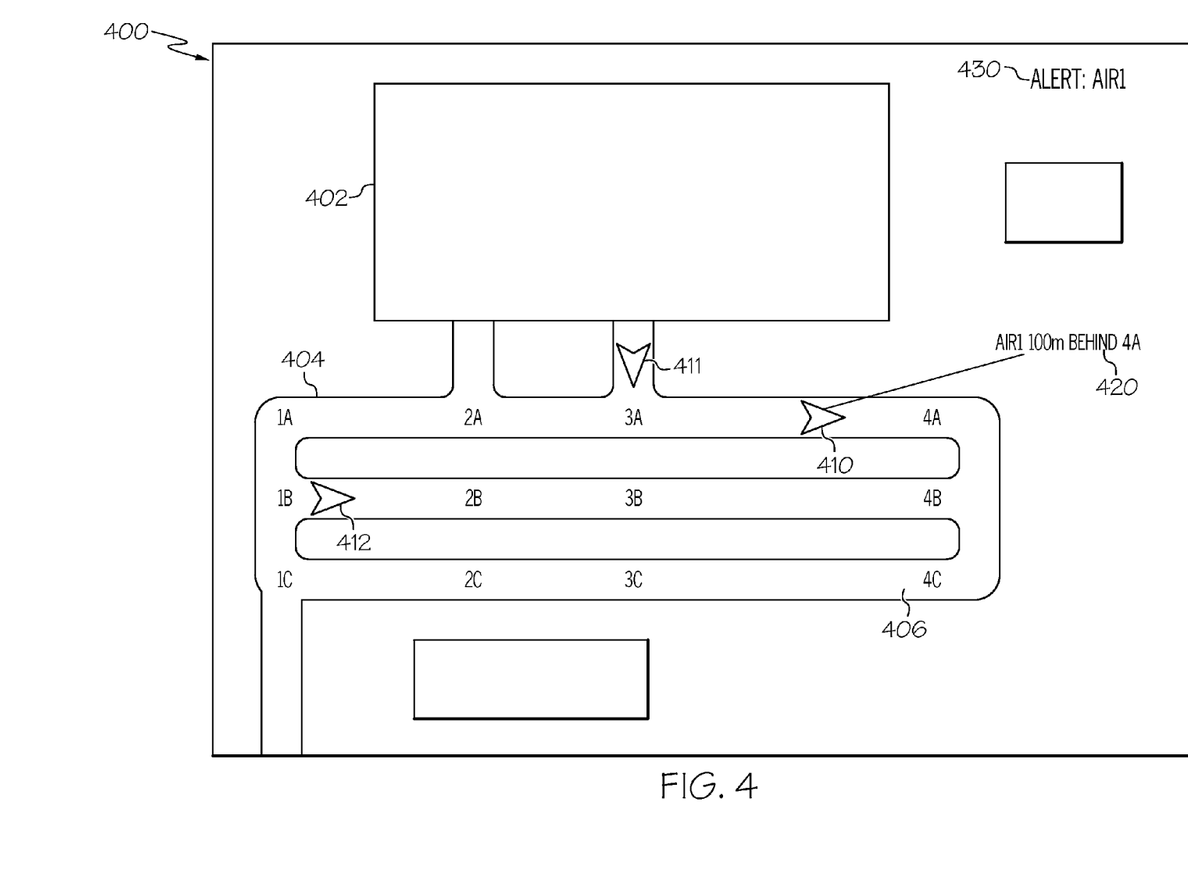
FIG. 4 is a simplified traffic display that may be generated according to the aircraft system of FIG. 2 and the method of FIG. 3 in accordance with an exemplary embodiment.

Reference is briefly made to FIG. 4, which is a simplified traffic display 400 that may be presented to the air traffic control. As noted above, the information presented in display 400 may be parsed or otherwise generated at least partially based on the messages of method 300 (FIG. 3). The display 400 is merely an example, and other uses or presentation of the information from the messages may be provided. In one exemplary embodiment, the display 400 may be part of an airport surface detection equipment, model X (ASDE-X) system or program. As shown, the traffic display 400 may resemble an airport map with schematic representations of various aspects of the airport, including buildings 402 and a runway and taxiway system 404. In this example, the runway and taxiway system 404 includes geographic position markings 406 that provide location coordinates or positions within the airport and may correspond to the geographic position markings 150 (FIG. 1) discussed above. The display 400 may further include aircraft icons 410, 411, 412 representing the current positions of aircraft that are navigating the airport. Various types of information about each aircraft may be provided. In one exemplary embodiment, information from the messages (e.g., the CPDLC messages) generated and sent in steps 325 and 330 may be represented in the display 400. For example, in FIG. 4, aircraft associated with icon 410 has sent a message to air traffic control, and in response, the display 400 presents the message information 420. In this exemplary embodiment, the message information 420 includes the aircraft identification and the free text portion of the message that identifies the position of the aircraft relative to the airport marker, e.g., the geographic position markings. Other types of information may be provided. As noted above, this information may be parsed from the message from the aircraft and formatted for the display 400. Additionally, in some embodiments, the content of the message (e.g., due to the reported position and/or other information in the message) may generate a warning 430 that may also be provided on display 400. Visual or aural warnings may be provided.

In step 335, the system 200 receives appropriate confirmation or instructions from air traffic control. For example, if the airport marker is a holding position, it may be necessary to receive the appropriate clearance from air traffic control to proceed. In no clearance is necessary or desired, then this step may be omitted. Alternatively or additionally, the system 200 may respond to air traffic control instructions with a compliance message and/or other message. In some exemplary embodiments, the system 200 may display an alert to the operator. Such an alert may be generated automatically by the system 200, or the alert may be based on communications from air traffic control.

Accordingly, the exemplary embodiments may reduce the workload of the aircraft operator and assist air traffic control in tracking the aircraft more efficiency in low visibility operations. For example, one particular exemplary embodiment discussed above may provide automatic reporting of aircraft position to air traffic control, e.g. including using CPDLC upon reaching a geographic position marker. In addition to geographic position markers, exemplary embodiment may be applicable to other types of airport markers, such as ILS critical areas, taxiway surface painted location signs, runway threshold markings, runway aiming points, holding position markings, and the like, such that air traffic control may be informed when the aircraft reaches each of these points during the airport surface navigation. Exemplary embodiments may be enhancement to current systems, such as the Honeywell SmartView™ system.

Additionally, the exemplary embodiments provide improved surface operations with little or no additional hardware on the part of the aircraft and/or airport. For example, exemplary embodiments may not require additional hardware in the form of transmitters encoded with a designated location installed on the airport surface along the airport lighting, signage, and markings, nor does it require additional equipment on the aircraft, as many aircraft are already equipped with infrared cameras and synthetic vision databases used for other purposes. However, such aspects may be incorporated into exemplary embodiments, as appropriate. As a further example, the exemplary embodiments may not require additional communication hardware or protocols in that exemplary embodiments may use CPDLC messages and/or existing networks.

Exemplary embodiments may provide more reliable and faster transmissions of position reports to air traffic control or other aircraft, thereby enabling more reliable and faster management of airport traffic. In some embodiments, the systems and methods described above may provide advantages over conventional systems, particularly embodiments in which position reporting based on airport markers is automatically communicated to air traffic control, as appropriate. As noted above, such reporting may be in the form of text-based CPDLC messages transmitted over FAN ACARS or ATN messages. For example, such exemplary embodiments may not require radar technology or suffer from inadequate resolution or coverage, signal strength, fading targets, inaccurate detection, cluttering, and false and out of range detections. Some exemplary embodiments may not require GPS systems, which may suffer from signal accuracy and frequency issues and outages. Exemplary embodiments may prevent the operator from missing and/or failing to properly locate and/or report the position of the aircraft at the geographic position markings and other important airport markers. Exemplary embodiments may not rely on voice communications and associated issues with respect to reliability and clarity. In some scenarios, the systems and methods described above may function as a "fail-safe" mechanism to prevent runway incursions and avoid near-miss accidents.

Embodiments of the present invention may be described in terms of functional block diagrams and various processing steps. It should be appreciated that such functional blocks may be realized in many different forms of hardware, firmware, and or software components configured to perform the various functions. For example, embodiments of the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft system, comprising:
   a processing unit configured to identify an airport marker during a surface operation at an airport and evaluate an action associated with the airport marker, the processing unit further configured to automatically generate a reporting message based on the airport marker at a predetermined location relative to the airport marker only when the action associated with the airport marker requires reporting;
   a transceiver coupled to the processing unit and configured to send the reporting message; and
   enhanced vision sensors coupled to the processing unit and configured to supply sensor data to the processing unit, wherein the processing unit is configured to identify the airport marker based on the sensor data,
   wherein the processing unit is configured to format the reporting message according to a controller pilot data link communication (CPDLC) standard, and wherein the reporting message is a CPDLC message with a free text portion, and wherein the processing unit is configured to generate the reporting message with information about the airport marker as the free text portion.

2. The aircraft system of claim 1, wherein the predetermined location is a predetermined distance from the airport marker.

3. The aircraft system of claim 1, wherein the predetermined location is at the airport marker.

4. The aircraft system of claim 1, wherein the processing unit is further configured to generate the reporting message with an aircraft identification and an aircraft location.

5. The aircraft system of claim 1, wherein the transceiver is configured to send the reporting message over a Future Air Navigation Services (FANS) network or Aeronautical Telecommunications Network (ATN).

6. The aircraft system of claim 1, wherein the transceiver is configured to send the reporting message over an Aircraft Communications Addressing and Reporting System (ACARS) network.

7. The aircraft system of claim 1, wherein the airport marker is a geographic position marking.

8. The aircraft system of claim 1, wherein the processing unit is configured to extract alphanumeric identifying information from the airport marker to identify the airport marker.

9. The aircraft system of claim 1, further comprising a database coupled to the processing unit and containing airport marker data, wherein the processing unit is configured to identify the airport marker and the action associated with the aircraft marker based on the airport marker data from the database.

* * * * *